United States Patent
Chang et al.

(10) Patent No.: US 6,564,065 B1
(45) Date of Patent: May 13, 2003

(54) BAYESIAN-UPDATE BASED LOCATION PREDICTION METHOD FOR CDMA SYSTEMS

(75) Inventors: Kirk K. Chang, Monmouth, NJ (US); Byron H. Chen, Morris, NJ (US); Tung C. Chiang, Union, NJ (US); John Freidenfelds, Morris, NJ (US); Daniel R. Jeske, Monmouth, NJ (US); Kiran M. Rege, Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/294,997

(22) Filed: Apr. 20, 1999

(51) Int. Cl.⁷ .................................................. H04Q 7/20
(52) U.S. Cl. ........................ 455/457; 455/426; 455/456; 342/357.02
(58) Field of Search ................................. 455/456, 436, 455/440, 524, 450, 426, 422, 457; 342/357.1, 357.2, 357.3, 357.4; 370/528

(56) References Cited

U.S. PATENT DOCUMENTS

| | | | | |
|---|---|---|---|---|
| 5,508,707 A | * | 4/1996 | LeBlanc et al. | 342/457 |
| 5,602,903 A | * | 2/1997 | LeBlanc et al. | 455/456 |
| 5,768,686 A | * | 6/1998 | LeBlanc et al. | 455/31.1 |
| 5,949,988 A | * | 9/1999 | Feisullin et al. | 395/500.23 |
| 5,960,341 A | * | 9/1999 | LeBlanc et al. | 455/426 |
| 6,046,698 A | * | 4/2000 | Pandey | 342/360 |
| 6,052,598 A | * | 4/2000 | Rudrapatna et al. | 455/456 |
| 6,067,484 A | * | 5/2000 | Rowson et al. | 701/16 |

OTHER PUBLICATIONS

Hellebrandt (Estimating position and velocity of Mobiles in a cellular Radio Network, vol. 46, No. 1, Feb. 1997).*

* cited by examiner

Primary Examiner—Daniel Hunter
Assistant Examiner—Pablo N Tran
(74) Attorney, Agent, or Firm—Harness, Dickey & Pierce P.L.C.

(57) ABSTRACT

The location of a mobile unit in the service area of a CDMA cellular telephone system is predicted from a spatial probability distribution that is generated over a region of sub-cells within the service area. The spatial distribution, and hence the predicted location, is updated sequentially based on RF measurements provided by the mobile unit through the use of a Bayesian-update method.

19 Claims, 7 Drawing Sheets

BAYESIAN-UPDATE BASED LOCATION PREDICTION METHOD FOR CDMA SYSTEMS

CROSS REFERENCE TO RELATED APPLICATION

This application is related to U.S. Ser. No. 09/139,107 entitled "Pattern Recognition-Based Geolocation", filed in the names of T. C. Chiang et al on Aug. 26, 1998. The related application is assigned to the assignee of the present invention and is meant to be incorporated herein by reference.

BACKGROUND OF THE INVENTION

1. Field of the Invention

The present invention relates to a method for locating a mobile telephone unit within a cellular service area, and more particularly to a method for estimating the location of a mobile unit based upon the probability of its being at a particular location of the service area given a certain set of observed attributes.

2. Description of the Related Art

A cellular telephone system must be able to locate a mobile unit within a cellular service area under various RF propagation conditions such, for example, when an E911 call is made from the mobile unit. Conventional methods for locating a mobile unit are typically based on either a triangulation technique which requires signals from three or more base stations within a designated service area, or an angle of arrival technique which requires at least two base stations. In many areas, the number of base stations the mobile unit can detect is less than two. Furthermore, both the triangulation and angle of arrival techniques inherently suffer from inaccuracies and signal fading which result from multi-path propagation.

In the above-noted related patent application, RF characteristics pertaining to one or more pilot signals radiated from a base station and specific to a particular location within the service area are detected by a mobile unit and transmitted back to a basestation where they are matched to a known set of RF characteristics and other information stored in a database located, for example, in a base station server. The database contains what is known in the art as attribute information and includes, for example, RF characteristics, e.g. pilot signal strength measurements indicative of power and phase-offset, time delay, angle of arrival and round-trip delay of pilot signals which differentiates one location from another. For convenience, the cellular service area is divided into a rectilinear grid and an exhaustive survey consisting of measurements of different attributes is carried out at each of the grid points (sub-cells) to identify the attribute values associated therewith. This information is stored in the database. It should be noted that collection of this information is an inherently time consuming and costly procedure.

SUMMARY OF THE INVENTION

The present invention is directed to a method of estimating, by a Bayesian probability computation procedure, the location of a mobile unit in the service area of a CDMA cellular telephone system and which, among other things, simplifies the generation of a database and eliminates the need for repeated attribute measurements at all of the grid points (sub-cells) in the cellular service area by using a model based approach.

In the present invention, for pilot signal strength or power measurements, a model for RF signal propagation which is used to characterize RF environments is first generated. The model is expressed in terms of a number of parameters such as total transmit power levels, pilot channel powers, antenna patterns and gains, antenna orientations, distance loss parameters, shadow fading parameters, etc. Some of these parameters are known to the service provider. Values of the other parameters are determined by carrying out pilot strength measurements along a few representative routes in the service area and adjusting the values of these parameters until they yield a good match between the pilot strength values predicted by the model and the corresponding measurements. In the case of a large and diverse service area, multiple models representing different parts of the sub-area may be needed. Once the optimal parameters have been determined, no more data needs to be collected. A database containing pilot signal visibility probabilities for each grid-point or sub-cell in the service area is next generated and stored in memory by running a simulation for all grid-points or sub-cells in the service area. Next, for the other attributes such as phase offsets, their behavior is characterized through a statistical model of the conditional probability of a mobile unit observing a specific phase-offset given that the mobile unit is located at a given sub-cell. This model is expressed in terms of a few parameters which, also, need to be determined through measurements. Once again, measurements at a few representative locations in the service area suffice for parameter estimation. Exhaustive measurements are not needed as in the referenced invention. The statistical model, moreover, is computationally straight forward, does not need a database, and can be generated in real time.

When pilot strength and phase offset measurements reported by a mobile unit are received by a location server, it uses these two models to determine the probability of the mobile units being at different grid-points within the service area given the measurements reported by it.

In the preferred method, an "a-posteriori" location probability distribution is used as an estimate of the mobile unit's location. If the mobile unit reports multiple sets of measurements made at relatively small time intervals, the location server iteratively computes the location probability distribution. In this process, the "a-posteriori" distribution computed at the end of one step is used as the "a-priori" distribution for the next step. This procedure is referred to herein as the Bayesian-Update Location prediction Method (BLMP).

DETAILED DESCRIPTION OF THE INVENTION

Figure 1:
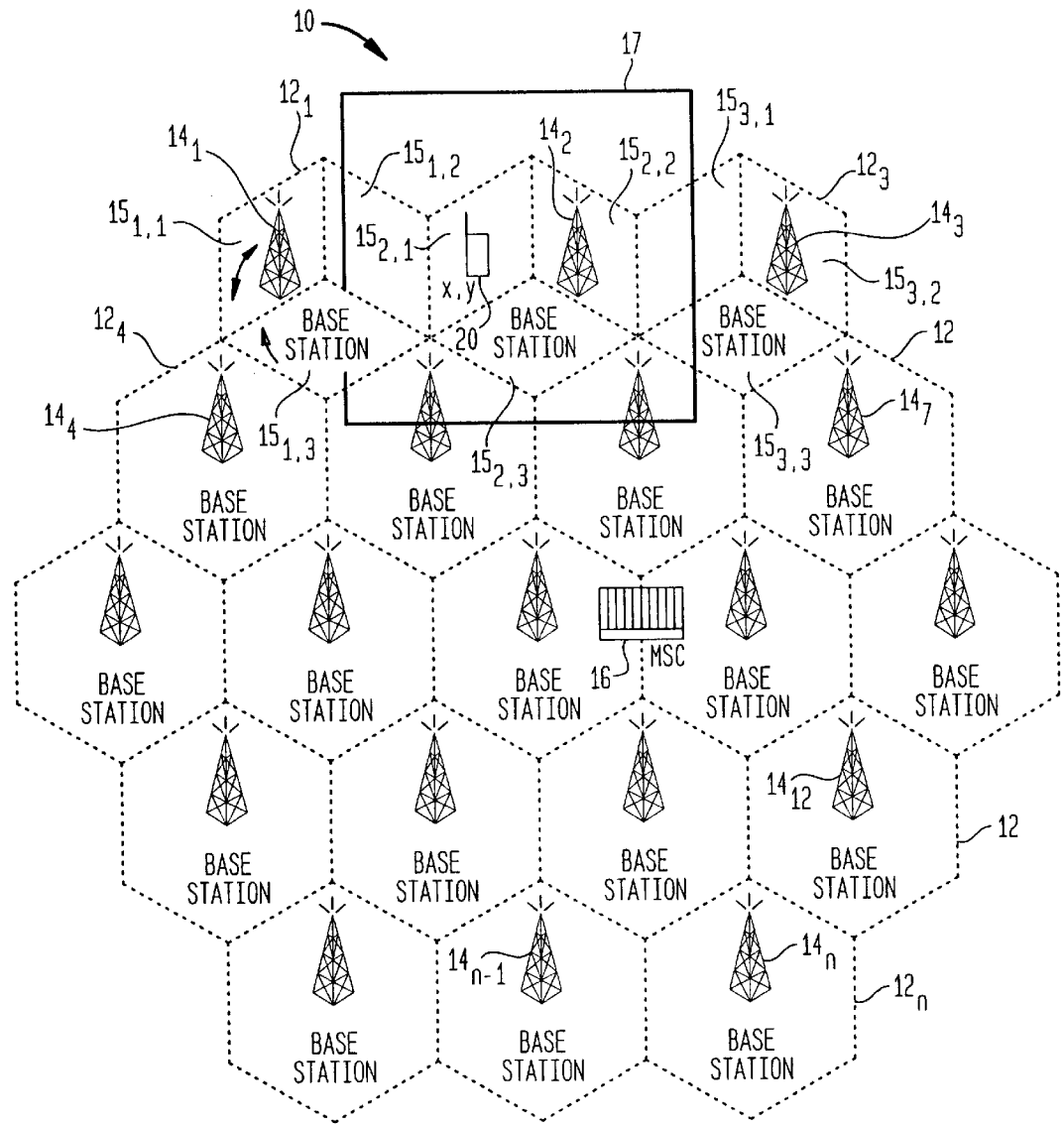
FIG. 1 is illustrative of a cellular service area divided into a plurality of cells.

Referring now to the drawings and more particularly to FIG. 1, reference numeral 10 denotes a service area for a CDMA cellular telephone system partitioned into a plurality of contiguous hexagonal cells 12. FIG. 1 also depicts, a plurality of base stations $14_1$, $14_2$, . . . $14_{n-1}$, $14_n$ located within the service area 10. Also, the service area 10 includes at least one mobile switching center (MSC) 16. Typically, each base station $14_1$ . . . $14_n$ has a sectorized antenna with a distinct pilot signal channel associated with each sector. Three sectored antennas are most common. In FIG. 1, all of the base stations have three sectors each The three sectors associated with base station $14_1$, for example, are denoted by the symbols $15_{1,1}$, $15_{1,2}$ and $15_{1,3}$, respectively. A mobile unit 20 is located in sector $15_{2,1}$.

Figure 2:
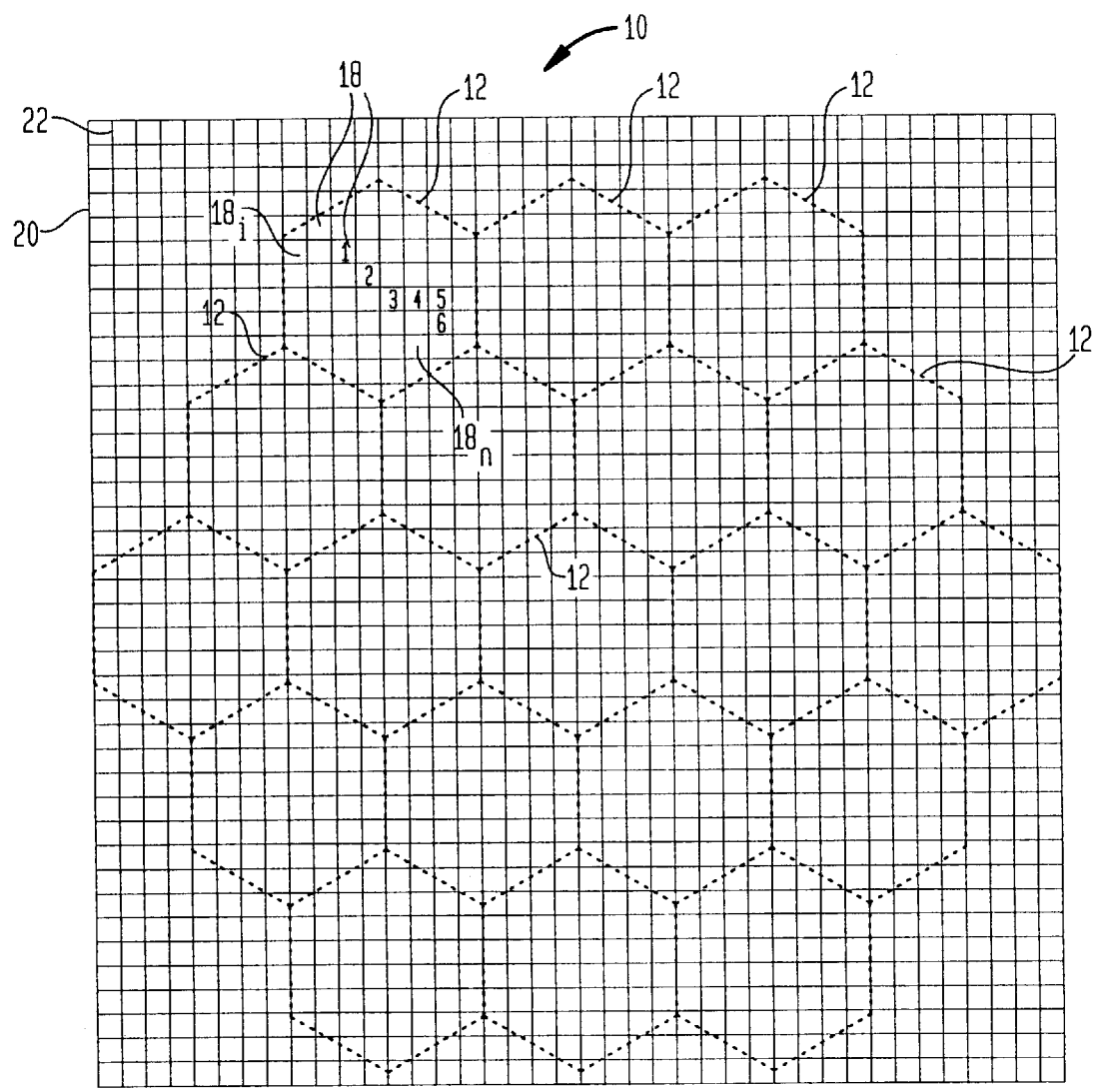
FIG. 2 is illustrative of the cells shown in FIG. 1 being further divided into sub-cells.

FIG. 2 is further illustrative of the cells 12 being further divided into sub-cells 18 and which are represented by a grid formed by rectilinear grid lines 20 and 22. The reference numbers 1, 2, 3, . . . , 6 of FIG. 2 represent individual sub-cells $18_1$, $18_2$, . . . $18_6$, respectively.

Figure 3:
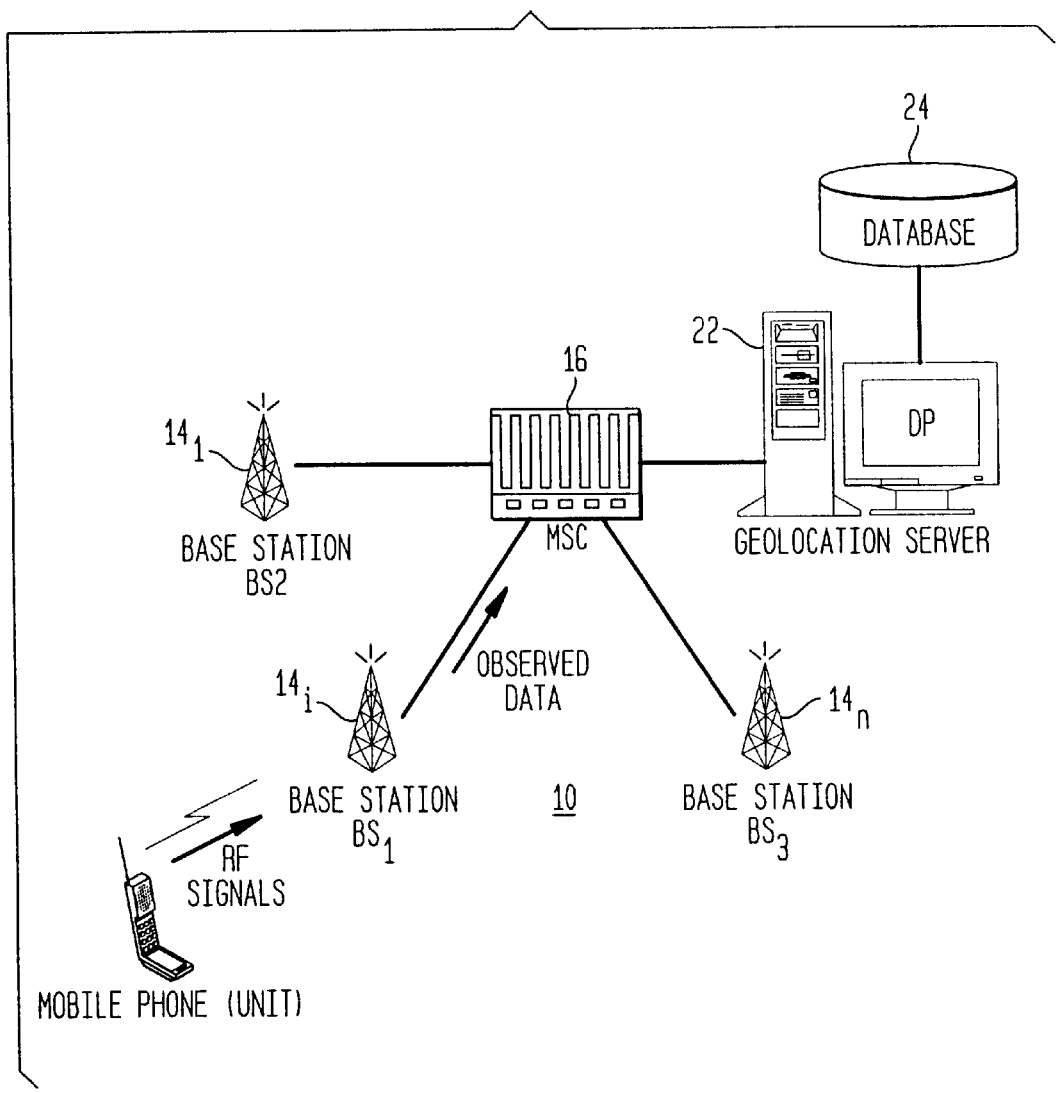
FIG. 3 is illustrative of an embodiment of the subject invention.

Turning attention now FIG. 3, shown thereat is a diagram broadly illustrative of the system architecture for determining the location of a mobile unit 20 within the service area 10 in accordance with the subject invention. The MSC 16 operates in conjunction with a plurality of base stations $14_1$, . . . $14_n$ and connects to the local telephone system, not shown. A server 22 comprised of digital computer apparatus and a memory 24 for storing a digital database (DB) are typically located at the site of the MSC 16 for purposes which will now be explained.

In the invention described in above referenced related application U.S. Ser. No. 09/139,107, each sub-cell $18_1$ . . . $18_n$ of the service area 10 (FIG. 3) is identified by a set of observable, i.e. detectable characteristics which are referred to as attributes and include, for example, RF characteristics, e.g. measured pilot signal power (Ec/Io) from different sectors, phase-offsets, time delay or angle of arrival, and round trip delays of one or more pilot signals, hereinafter referred to simply as "pilots", radiated from each of the base stations $14_1$ . . . $14_n$.

The database (DB) in U.S. Ser. No. 09/139,107 contains attribute information which differentiates one sub-cell 18 from another and is generated by making a repeated and exhaustive survey which involves taking repeated measurements at all the sub-cells $18_1$, . . . $18_n$ (FIG. 2) of the service area 10. During the operation phase, after the database has been set up and the location service has been deployed, the mobile unit 20 detects and measures attribute values, e.g., pilot strengths and phase offsets, from its actual location in sub-cell $18_i$ and reports them via a message, e.g. a pilot strength measurement message (PSMM), to the base station(s) $14_1$ . . . $14_n$ (FIG. 3), which can be one or more of the base stations with which it is in communication. The base station(s) forward their respective reported measurements to a location server 22 via MSC 16. When the attributes are reported to the server 22, the digital computer apparatus 23 associated with the server 22 statistically compares the measured values with the known attribute values stored in the database 24 of all the sub-cells 18 in the service area 10. The sub-cell $18_i$ whose attribute values as stored in the database provide the best match for the measurements reported by the mobile unit 20 is considered to be the best estimate of the mobile unit's location.

Considering now the present invention, it also uses a database; however, in contrast to the above-referenced related invention shown and described in U.S. Ser. No. 09/139,107, the present invention uses a model based approach to generate the database. The database contains for each sub-cell $18_1$ . . . $18_n$ in the service area 10, the probabilities that different pilots are visible in that sub-cell. In accordance with this approach, a limited number of pilot strength measurements are carried out along a few representative routes in the service area 10 and an RF signal propagation model is constructed to represent the RF environment associated with the service area. The parameters of this model are adjusted to yield a substantially good match between pilot strengths predicted by the model and the corresponding measurements.

The RF propagation model used to represent the RF environment associated with the service area and how it is used to generate the database containing pilot visibility probabilities will now be explained.

With reference to FIG. 1, for sectors $15_{1,1}$, $15_{1,2}$, $15_{1,3}$, $15_{2,1}$ . . . $15_{n,3}$, let $T_{1,1}$, $T_{1,2}$, $T_{1,3}$, $T_{2,1}$, . . . , $T_{n,3}$ respectively denote the total transmit powers associated with those sectors. Assume that each sector uses a fraction, $\gamma$, of its total transmit power for its pilot channel. For example, the pilot channel power for sector $15_{1,1}$ is given by $\gamma T_{1,1}$.

Now consider a mobile unit 20 at a location (x,y) in the service area 10. The model assumes that the total power $R_{i,j}(x,y)$ received by a mobile unit 20 from sector $15_{i,j}$ (i=1, 2, . . . , n and j=1, 2, 3) is given by:

$$R_{i,j}(x,y)=T_{i,j} \cdot G_{i,j}(x,y) \cdot L_{i,j}(x,y) \cdot F_{i,j}(x,y) \quad (1)$$

where $G_{i,j}(x,y)$ is the antenna gain for sector $15_{i,j}$ along the direction pointing towards, the location (x,y), $L_{i,j}(x,y)$ is the distance loss between the base station $14_i$ associated with sector $15_{i,j}$ and the location (x,y) and $F_{i,j}(x,y)$ is the corresponding shadow fading factor, all in absolute, not dB, units. The pilot channel power received by the mobile unit 20 at location (x,y) from sector $15_{i,j}$ is then equal to $\gamma R_{i,j}(x,y)$.

The model assumes that the distance loss $L_{i,j}(x,y)$ can be expressed as:

$$L_{i,j}(x,y)=C_p \cdot [d_{i,j}(x,y)]^{-\alpha} \quad (2)$$

where $d_{i,j}(x,y)$ is the distance between the base station $14_i$ associated with the sector $15_{i,j}$ and the location (x,y), and $C_p$ and $\alpha$ are constants. Typically, $C_p$ takes a value in the range $10^{-10}$ to $10^{-15}$ and $\alpha$ is between 3 and 5 when $d_{i,j}(x,y)$ is expressed in units of miles. The two parameters $C_p$ and $\alpha$, moreover, are environment specific.

The shadow fading factor $F_{i,j}(x,y)$ models the impact of terrain and large structures on signal propagation, which create deviations around the signal attenuation predicted by the deterministic path loss and can be written as:

$$F_{i,j}(x, y) = 10^{a+(X_{i,j}/10)} \quad (3)$$

where X is a non-zero Gaussian random variable with standard deviation $\alpha$ and a is a normalization constant chosen so that the mean value of $F_{i,j}(x,y)$ equals 1. Moreover, shadow fading factors display spatial correlation. That is, shadow fading factors between a base station $14_i$ and locations that are reasonably close to each other display statistical correlation. This fact can be represented in the model as follows.

Let $(x_1,y_1)$ and $(x_2,y_2)$ be two locations in the service area separated by d meters and let $F_{i,j}(x_1,y_1)$ and $F_{i,j}(x_2, y_2)$ respectively, be the shadow fading factors between the sector $15_{i,j}$ and the locations $(x_1,y_1)$ and $(x_2,y_2)$:

Accordingly, $$F_{i,j}(x_1,y_1)=10^{\alpha+(X_{i,j}(1)/10)} \quad (4a)$$

and $$F_{i,j}(x_2,y_2)=10^{\alpha+(X_{i,j}(2)/10)} \quad (4b)$$

Next the model assumes that the covariance between the exponents $X^{(1)}_{i,j}$ and $X^{(2)}_{i,j}$ is given by:

$$E[X_{i,j}^{(1)} X_{i,j}^{(2)}] = \eta \sqrt{E[(X_{i,j}^{(1)})^2] E[(X_{i,j}^{(2)})^2]} = \eta \sigma^2 \qquad (5)$$

where $\eta = e^{-d/D_0}$. The parameter $D_0$ is called the correlation length associated with the shadow fading environment. It is found that depending on the environment, the correlation length can vary from a few tens of meters to several hundreds of meters.

Assume now also that the pilot strength measurement carried out and reported to the base station $14_i$ by the mobile unit 20 is the ($E_c/I_o$ value) of the corresponding pilot channel signal. This value is the ratio of the pilot channel power from the concerned sector received by the mobile unit 20 to the total power received by the mobile unit including thermal noise, and, possibly, external interference.

By letting $P_{i,j}(x,y)$ denote the power ($E_c/I_o$ value) of pilot channel associated with sector $15_{i,j}$ as measured by a mobile unit located at the point (x,y), Then:

$$P_{i,j}(x,y) = \frac{\gamma R_{i,j}(x,y)}{N_0 + R_{1,1}(x,y) + R_{1,2}(x,y) + \ldots + R_{n,3}(x,y)} \qquad (6)$$

where $N_0$ denotes the thermal noise and external interference. Hereafter, for convenience, the symbol (i,j) will be used to refer to the pilot channel associated with sector $15_{i,j}$.

The description of the RF propagation and pilot measurement model is now complete. Note that the parameters pertaining to the total transmit powers i.e. $T_{1,1}, T_{1,2}, \ldots$, the fraction $\gamma$ of power used for the pilot channel, the antenna gains and orientations which enable one to compute antenna gains in different directions are known to the service provider. Thus, the only parameters whose values need to be determined by matching predicted pilots strengths with measured values are the distance loss parameters $C_p$ and $\alpha$, the shadow fading standard deviation $\sigma$, correlation length $D_0$, and the thermal noise power $N_0$.

Once all of the unknown parameters are determined, the process of populating the database with pilot visibility probabilities can be undertaken. In this illustrative example, it is assumed that the location prediction method uses pilot strength information in a binary form, that is, it is only concerned with whether or not a pilot was visible (i.e. its $E_c/I_o$ value was measured above a predetermined threshold T). Then, the database is populated as follows.

Noting that a pilot (i,j) would be visible at location (x,y) if, $$P_{i,j}(x,y) = \frac{\gamma R_{i,j}(x,y)}{N_0 + R_{1,1}(x,y) + \ldots + R_{n,3}(x,y)} \geq T. \qquad (7)$$

then, to populate the database, what is needed for each location (x,y) is the probability $\Pr[P_{i,j}(x,y) \geq T]$ for each pilot (i,j) that can possibly be seen at that location. These probabilities can be obtained by running a simulation for all grid-points (x,y) in the service area. Before the simulations are carried out, however, for each grid-point (x,y), several counters, one for each of the pilots that can possibly be measured above the threshold T at the grid-point (x,y), are established and set to "0". In each run of the simulation the shadow fading factors between each grid-point and base station pair are generated according to the appropriate statistical model as described above. The path loss values between a given base station and grid-point are deterministic and once computed can be reused in all the simulation runs.

Using these factors along with other factors such as path losses, antenna gains, etc., the $E_c/I_o$ value for each pilot can be determined for each grid-point (x,y). If, during a simulation run, the $E_c/I_o$ value of the pilot (i,j) (i.e. $P_{i,j}(x,y)$) is found to be greater than or equal to the threshold T the corresponding counter is incremented by "1". If $P_{i,j}(x,y)$ is found to be below the threshold T, the corresponding counter is left unchanged. A large number of simulation runs, each with a different "seed", are made.

Figure 4:
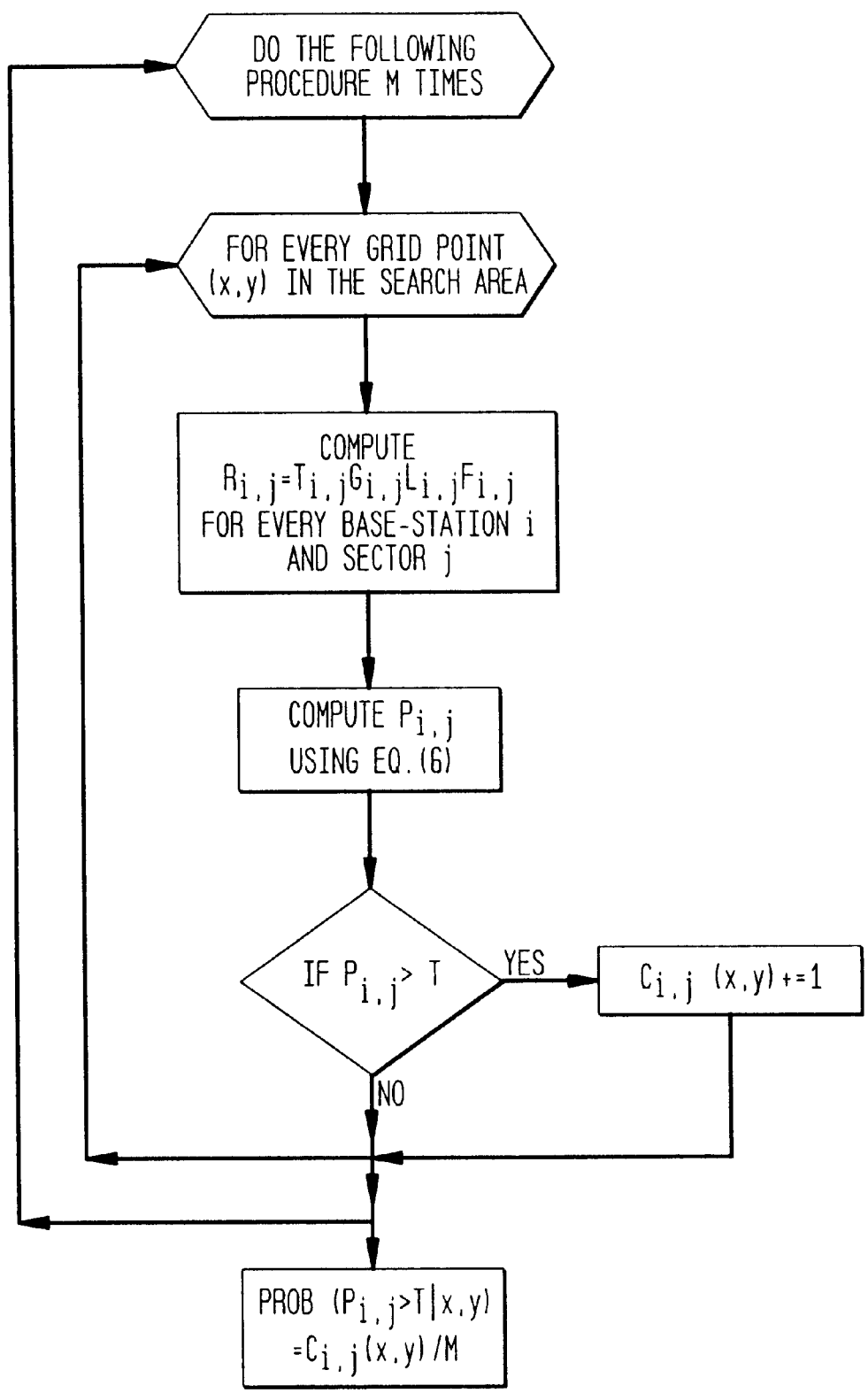
FIG. 4 is a flow chart illustrative of the method for generating a probability database based on the RF signal propagation in accordance with the subject invention.

Assume that M simulation runs are made. At the end of these simulation runs, let $C_{ij}(x,y)/M$ be the value of the counter associated with the visibility of the pilot (i,j) at the grid-point (x,y). Then it is assumed that the probability of the pilot (i,j) being visible at the grid-point (x,y), i.e. $\Pr[P_{i,j}(x,y) \geq T] = C_{ij}(x,y)/N$. These probability values are stored in the database. The flow chart of FIG. 4 illustrates this procedure.

The RF signal propagation and pilot measurement model described above is used to process the pilot strength (or visibility) information reported by the mobile unit 20 in order to determine the latter's location.

Another model will now be described and is used to process the "phase offset" information reported by a mobile unit. Assume that pilots (i,j) and (k,l) are visible at location (x,y) and the corresponding base stations are $14_i$ and $14_k$. Let p denote the actual phase offset between these two pilots when they are received at the location (x,y). The phase offset, p, refers to the time difference between the arrival of the pilot signals at location (x,y). Assume also that p equals the sum of two components, the first pertaining to the difference in propagation times for those pilot signals if they were to follow the direct, line-of-sight paths from their respective base stations to the location (x,y), and the second pertains to a random deviation which may be caused by the fact that these signals often arrive after several reflections, diffractions, etc. Thus $$p = (d_k - d_i)/c + v \qquad (8)$$

where $d_i$ and $d_k$, respectively, denote the distance between the base station $14_i$ and $14_k$ and the location (x,y), c is the speed of light in air and v is the second component of the phase offset described above. Assume further that v is a Gaussian random variable with mean zero and standard deviation $\beta$. The actual phase offset, p, then has the following Gaussian distribution $$\Pr[p_1 \leq p < p_2] = \frac{1}{\sqrt{2\pi}\,\beta} \int_{p_1}^{p_2} \exp\left(-\frac{\left(p - \left[\frac{d_j - d_i}{c}\right]\right)^2}{2\beta^2}\right) dp \qquad (9)$$

Typically, mobile units report phase offsets in terms of integral number "chip durations". A chip is a time interval corresponding to one symbol of the spreading sequence(s) used in Code Division Multiple Access (CDMA) wireless systems. For CDMA cellular systems based on the standards IS-95 or ANSI J-008, a chip duration equals about 0.8 microseconds. Thus, the probability of a mobile unit located at (x,y) reporting a phase offset of m chips (m is an integer) is given by:

$$\Pr\left[\left(m - \frac{1}{2}\right)\tau \leq p < \left(m + \frac{1}{2}\right)\tau\right] = \qquad (10)$$

-continued $$\frac{1}{\sqrt{2\pi}\,\beta}\int_{(m-\frac{1}{2})\tau}^{(m+\frac{1}{2})\tau}\exp\left(-\frac{\left(p-\left[\frac{d_j-d_i}{c}\right]\right)^2}{2\beta^2}\right)dp$$

where $\tau$ is the chip duration.

Equation (10) describes a statistical model for phase offsets which is expressed in terms of a single unknown parameter $\beta$. This parameter can be determined empirically via measurements at a few representative locations. Once again exhaustive measurements are not needed.

Once the database containing pilot visibility probabilities for different locations has been prepared and the model for phase offsets has been identified, the system can be said to be ready to provide the desired location estimation service.

Figure 5:
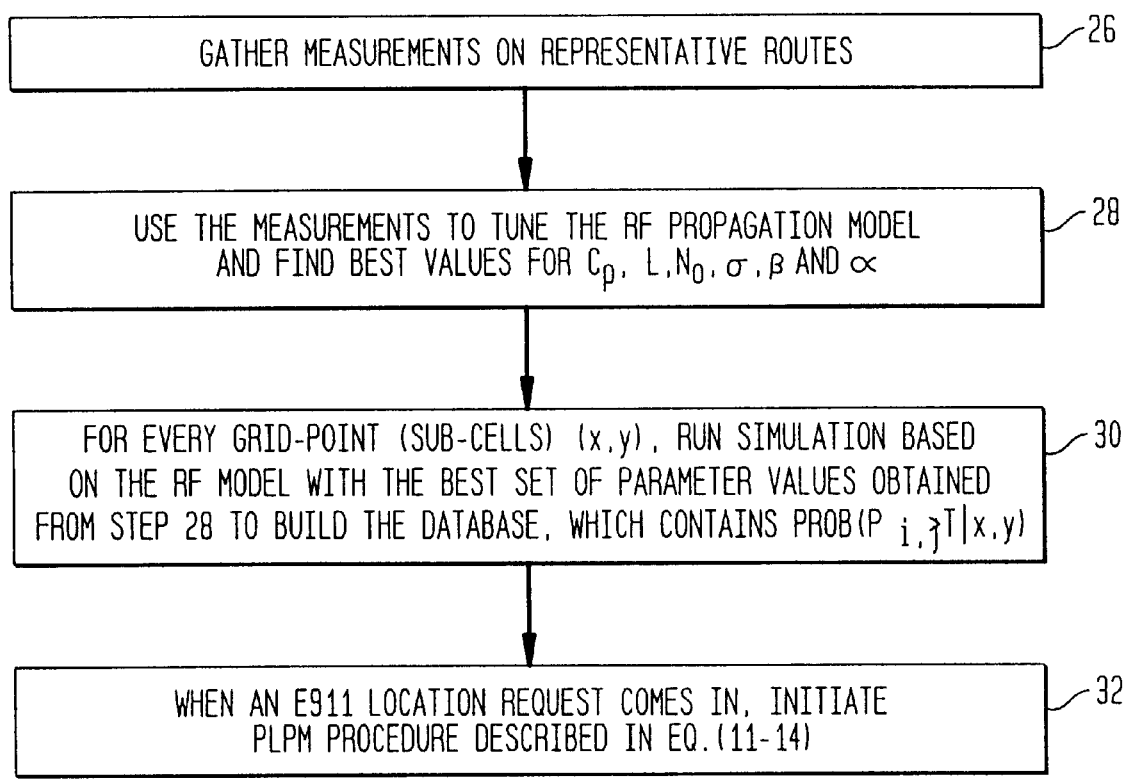
FIG. 5 is a flow chart generally illustrative of the method of determining the locality of a mobile unit in accordance with the subject invention.
Figure 6:
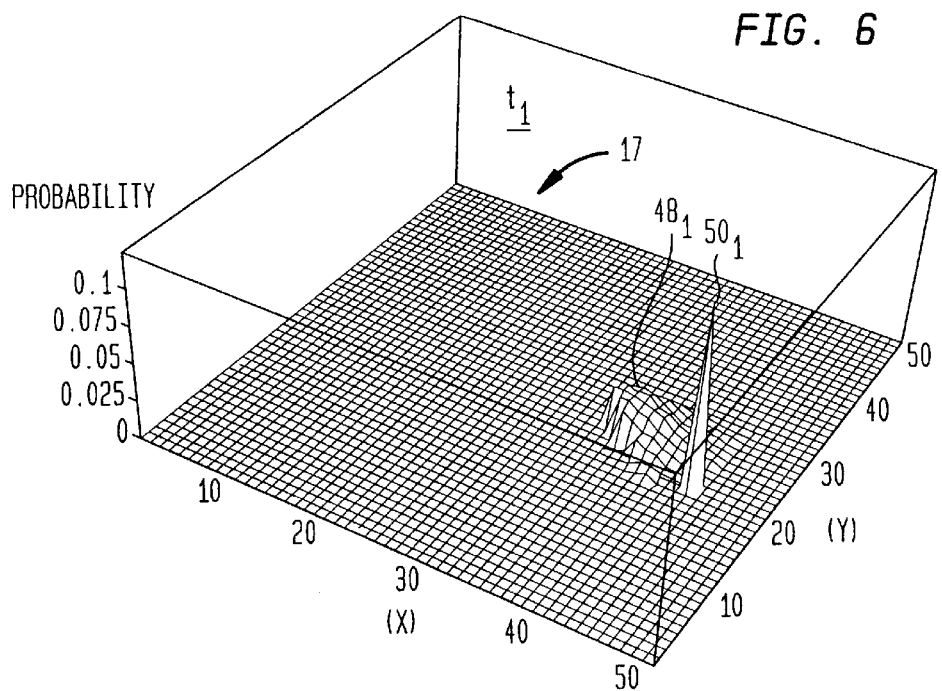
FIGS. 6–9 are a set of three dimensional plots which depict the a-posteriori location probability distribution produced by the Bayesian-update prediction method in accordance with the subject invention for four successive time periods.
Figure 7:
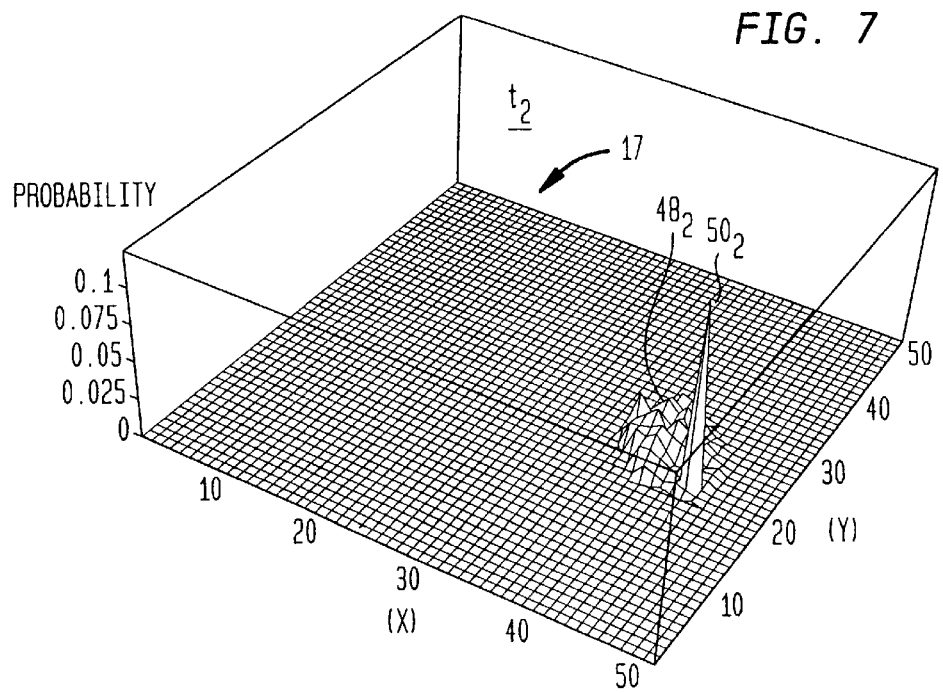

FIG. 5 is further illustrative of the foregoing description. Reference numeral 26, for example, denotes that the first step involves gathering measurements (data) on representative routes. This is followed by using these measurements to tune the RF propagation model and to find the best set of values for the parameters $c_p$, $\alpha$, L, $N_o$ and $\beta$ as shown by reference numeral 28. Then, as shown by block 30, for all grid points or sub-cells (x,y), a series of simulations are run based on the RF model with the best set of parameters obtained from step 28 in order to build a database (step 30) which contains the probability of seeing a pilot signal, i.e. being either "visible" or "invisible" at the location (x,y) for every x, y location in the search area.

The, last step 32 of FIG. 5 which involves the determination (estimation) of a mobile unit's location based on the pilot visibility probability and phase offset information reported by it and which will now be described. As mentioned above, the location estimate is computed using the Bayesian-Update Location Prediction Method (BLPM).

The BLPM is initiated when the location server 23 (FIG. 3) receives a location request from a mobile unit 20 along with a message relaying its pilot strength and phase offset measurements. Again, assume in this example that pilot strength measurements are of a binary form, i.e. they tell whether or not a pilot was above a predetermined threshold T when the mobile unit measured its strength.

When a first set of PSMM measurements is received, to reduce the number of computations, the location server then identifies a sub-region 17 (FIG. 1) of the service area 10 as the region in which the mobile unit 20 is likely to be located. One example of selecting this sub-region is to center around the area in which the primary pilot or the strongest pilot is most likely to appear. Thus, for instance, if the pilot (2,1) is the primary pilot of the mobile unit 20, the 7 sub-region 17 in FIG. 1 would be identified as the region in which the mobile unit is most likely to be located.

Now let the number of grid-points in this sub-region be N. Along with the sub-region 17, a set of pilots S consisting of all the pilots that can be visible at least one of the grid-points or sub-cells 18 included in the sub-region 17, is identified. The location server 22 now computes the a-priori, location probability distribution for the mobile unit 20. Let $\text{Prob}^{(0)}$(x,y) denote this a-priori location probability distribution. Then $\text{Prob}^{(0)}$(x,y) is given by:

$$\text{Prob}^{(0)}(x,y) = \begin{cases} 1/N & \text{if } (x,y) \text{ is in the sub-region} \\ 0 & \text{otherwise} \end{cases} \quad (11)$$

The form of $\text{Prob}^{(0)}$(x,y) as given above allows one to include in their computations only those grid-points that fall within the selected, sub-region 17, thus leading to a significant saving in computations. Let $\mathbf{0}_1$ denote first set of measurements reported by the mobile unit (at time $t_1$). $\mathbf{0}_1$ includes of the identities of all those pilots which were visible to the mobile unit 20 when it carried out the measurements. Let $(i_1,j_1),(i_2,j_2),\ldots,(i_K,j_K)$ denote these pilots. Suppose those K visible pilots came from L distinct base-stations $k_1, k_2, \ldots, k_L$. Without loss of generality, let $k_1$ be the reference base-station. Assume $\mathbf{0}_1$ also contains the phase offsets (expressed in integral multiples of chip durations) $\theta_{k_2 k_1}, \theta_{k_3 k_1}, \ldots, \theta_{k_L k_1}$. Then, for each grid-point (x,y) in the sub-region 17 and each pilot (i,j) in the set S, the BLPM uses the database and determines the conditional visibility/invisibility probabilities Prob $(P_{i,j}(x,y) \geq T)$ if the pilot was visible, Prob $(P_{i,j}(x,y) < T)$ if the pilot was not visible.

BLPM also determines the conditional probability of the reported phase offset for that pilot if the mobile unit were located at the grid-point (x,y). Equation (10) is used to determine this probability. Let Prob $(p_{k_i k_1}(x,y))$, $2 \leq i \leq L$ denote this conditional probability.

Now, the next step is to determine, for each grid-point (x,y) in the sub-region 17, the conditional probability of the mobile unit reporting the measurement set $\mathbf{0}_1$ if it were located at that grid-point. Let Prob $[\mathbf{0}_1|(x,y)]$ denote this conditional probability. The BLPM approximates this probability by the product of the individual conditional probabilities. Thus, $$\text{Prob}(O_1 \mid (x,y)) = \prod_{(i,j)\in V_1} \text{Prob}(P_{i,j}(x,y) \geq T) \cdot \quad (12)$$
$$\prod_{(i,j)\in (S-V_1)} \text{Prob}(P_{i,j}(x,y) < T) \cdot$$
$$\text{Prob}(p_{k_2 k_1}(x,y)) \cdot$$
$$\text{Prob}(p_{k_3 k_1}(x,y)) \ldots \text{Prob}(p_{k_L k_1}(x,y))$$

In the above expression $V_1$ refers to the set of pilots that were reported to be visible in the measurement set $\mathbf{0}_1$.

Once the conditional probability, Prob $\mathbf{0}_1|(x,y))$, is determined in the manner described above for each grid-point (x,y), the BLPM computes the a-posteriori location probability distribution for the mobile unit using the well-known Bayes theorem. In particular, the a-posteriori probability of the mobile unit 20 being at grid-point (x,y) given that the reported measurement set is $\mathbf{0}_1$ is given by $$\text{Prob}((x,y)\mid O_1) = \frac{\text{Prob}^{(0)}(x,y)\cdot \text{Prob}(O_1 \mid (x,y))}{\text{Prob}(O_1)}. \quad (13)$$

Note that the denominator of the right hand side in the above equation is common to all grid-points (x,y). Therefore, to compute the a-posteriori probability distribution, the product $\text{Prob}^{(0)}$(x,y) Prob($\mathbf{0}_1|$(x,y)) is evaluated for each grid-point (x,y) and then normalized so that the sum of the (normalized) products corresponding to different grid-points in the sub-region 17 equals unity. This completes the computation of the a-posteriori probability distribution of the mobile unit's location given the first reported measurement set $\mathbf{0}_1$.

The iterative nature of BLPM comes into play, as shown in FIGS. 6–9, when the mobile unit 20 reports multiple measurement sets $\mathbf{0}_1, \mathbf{0}_2, \ldots, \mathbf{0}_k$ at time instants $t_1, t_2, \ldots, t_k$ respectively. It is assumed here that $t_1 < t_2 < \ldots < t_k$. In this case the BLPM uses the a-posteriori location probability distribution computed at the end of one step as the a-priori distribution for the next step. To simplify computations, BLPM assumes all measurement sets to be conditionally independent given the mobile's unit's location. The following is a description of this procedure.

Let $P((x,y)|0_1, \ldots, 0_k)$ denote the a-posteriori location probability distribution at the end of the $k^{th}$ step, i.e. after accounting for the first k measurement sets. Here $1 \leq k \leq k-1$. To account for the $k+1^{St}$ measurement set, $0_{k+1}$, the BLPM uses the following relationships:

$$P((x, y) | O_1, O_2, \ldots, O_{k+1}) = \frac{P((x, y) | O_1, \ldots, O_k) \cdot P(O_{k+1} | (x, y), O_1, \ldots, O_k)}{P(O_{k+1} | O_1, \ldots, O_k)} \quad (14)$$

$$= \frac{P((x, y) | O_1, \ldots, O_k) \cdot P(O_{k+1} | (x, y))}{P(O_{k+1} | O_1, \ldots, O_k)}$$

Figure 8:
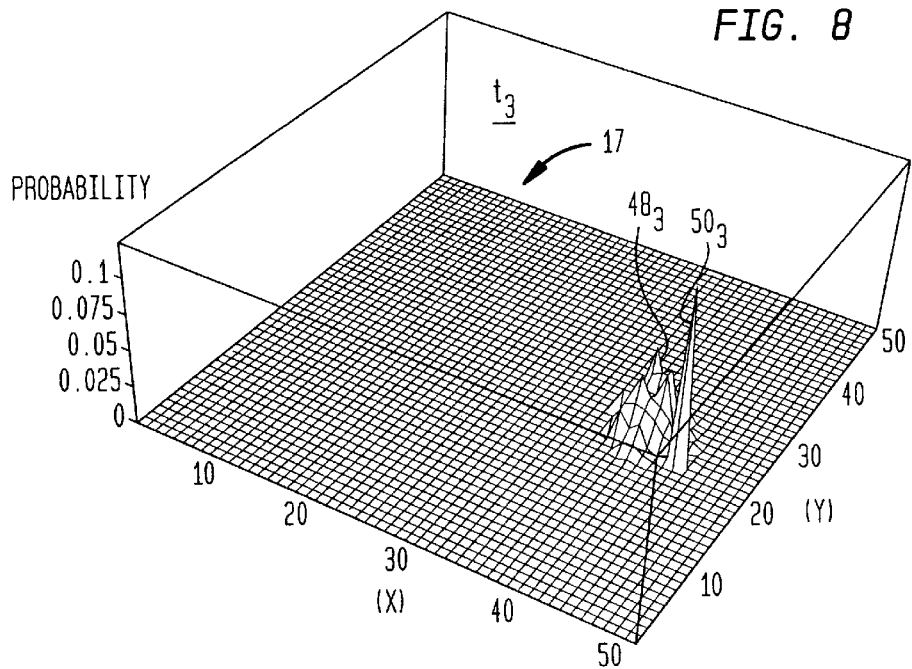
Figure 9:
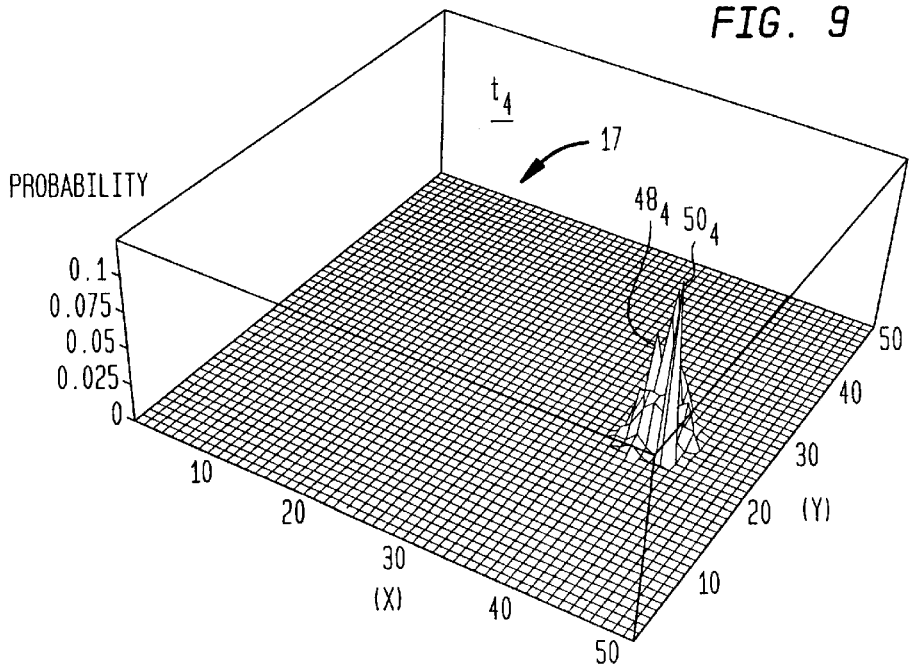

In deriving the above relationship an assumption has been made that the measurement set $0_{k+1}$ is conditionally independent of the measurement sets $0_1, 0_2, \ldots 0_k$ given that the mobile unit's location is (x,y). Notice that the above relationship between $P((x,y)|0_1, \ldots 0_k)$ and $P((x,y)|0_1, \ldots, 0_K)$ is similar to that between $P((x,y)|0_1)$ and $\text{Prob}^{(O)}(x,y)$ in equation (13) which represents the BLPM computations associated with the processing of the first measurement set $0_1$. Also as in equation (13), the denominator of equation (14), does not have to explicitly be evaluated if the numerations are all normalized so that they sum to unity. Thus, it is clear that to process each new measurement set the BLPM essentially repeats the same steps with the a-posteriori location probability distribution computed at the end of the previous step taking the place of the a-priori distribution for the new step. It should be noted that at the end of each step, a suitable function of the corresponding a-posteriori location probability distribution, e.g. the mean value, is computed as the best estimate of the mobile unit's location given all of the measurement sets processed up to that point in time as shown in FIGS. 6–9. At $t_0$ before the first iteration of a BLPM is launched, the grid floor would be level or flat since no probabilities have been calculated. At $t_1$ (FIG. 6), the first iteration is made and the location probability distribution comprising an "a posteriori" set of probabilities for the region 17 is shown. The set of probabilities calculated at $t_1$ is used as the a "priori" set for the computation of new "a posteriori" probabilities at $t_2$ in FIG. 7, which in turn becomes the "a priori" set for $t_3$ and so on as shown in FIGS. 8 and 9 where reference numerals $48_1$, $48_2$, $48_3$ and $48_4$ depict the "mean" estimate of the probability distribution while reference numerals $50_1$, $50_2$, $50_3$ and $50_4$ depict the "mode" estimate. It can be seen that the updating results in narrowing the region where the mobile unit is apt to be located.

The methodology described above is directed to the power and phase-offset measurements as the observations $0_r$. However, other sources of information can also be incorporated in $0_r$, e.g. round trip delay, angle of arrival, etc. when desired. It is believed that the accuracy of the algorithm will be greatly improved thereby. Thus, the advantages of the BLPM technique is that all types of information can be easily incorporated into the algorithm.

The foregoing merely illustrates the principles of the invention. It will thus be appreciated that those skilled in the art will be able to devise various other modifications to the method and apparatus as disclosed which, although not explicitly described as shown herein, embody the principles of the invention and are thus within its spirit and scope.

What is claimed is:

1. A method of estimating the location of a mobile communications unit in a communications service area, comprising the steps of:
    (a) detecting attribute information at the mobile unit, said attribute information being specific to the location wherein the mobile unit is presently located;
    (b) transmitting the attribute information to a remote location;
    (c) computing a probability distribution of the mobile unit being at different locations within the service area using a first and a second set of probability values related to mobile unit location, the first set of probability values including pilot signal visibility probabilities, and the second set of probability values including phase-offset probabilities; and
    (d) generating an output indicative of the location probability distribution, the detected attribute information including pilot signal power received from a base station located in the service area and phase-offset of a pilot signal observed by the mobile unit relative to a predetermined pilot signal.

2. A method according to claim 1 wherein said step (b) of computing uses a Bayes theorem.

3. A method according to claim 2 wherein the location probability distribution computed in step (b) comprises an a-posteriori location probability distribution.

4. A method according to claim 3 wherein the location probability distribution is iteratively updated at predetermined time intervals.

5. A method according to claim 3 and additionally including a step (d) prior to step (b) of sub-dividing the service area into a plurality of sub-areas and using at least one of said sub-areas in step (b) so as to reduce the number of computations required therein.

6. A method according to claim 1 and additionally including the steps of:
    (d) generating an RF a propagation model of the service area; and
    (e) generating and storing a database containing said pilot visibility probabilities for a predetermined number of locations within a service area using the RF signal propagation model.

7. A according to claim 6 and additionally including a step (f) of generating said phase offset probabilities by a statistical model of conditional probability of the mobile unit observing a specific pilot signal phase-offset at said predetermined number of locations within the service area.

8. A method according to claim 7 wherein said phase offset probabilities are generated on demand in real time.

9. A method according to claim 6 wherein the step (d) includes making parameter measurements along a selected number of representative routes in the service area for tuning the RF propagation model to the measured parameters.

10. A method according to claim 9 wherein the service area is defined by a plurality of cells which are further divided into a plurality of sub-cells.

11. A method according to claim 9 wherein the step (e) of generating the database includes running a simulation based on the RF propagation model for a predetermined number of the sub-cells in the service area.

12. A method according to claim 11 wherein said step of running a simulation comprises running a simulation for all of the sub-cells in the service area.

13. A method according to claim 6 wherein the RF propagation model includes a plurality of parameters having values which are determined, in accordance with the specific environment of the service area.

14. A system for estimating the location of a mobile communications unit in a communication service area comprising:
   a plurality of base stations located in the service area, each of said base stations including a sectorized antenna for a plurality of mutually adjacent communication signal sectors each generating a respective pilot signal having a different carrier frequency;
   computing apparatus for calculating, through the use of a statistical model, the probability of the mobile unit observing a set of phase-offsets of one or more of the pilot signals given its location;
   a memory for storing a database containing pilot signal visibility probabilities for a predetermined number of locations in the service area,
   said computing apparatus additionally calculating a location probability distribution of the mobile unit being at a plurality of different locations in the service area in response to the pilot signal visibility probabilities and the phase-offset conditional probabilities.

15. The system according to claim 14 wherein said computing apparatus comprises a digital server, and wherein said server apparatus and said memory are connected to the mobile switching center.

16. The system according to claim 14 wherein the location probability distribution is calculated using a Bayes theorem.

17. A system according to claim 16 wherein the location probability distribution comprises an a posteriori location probability distribution.

18. A system according to claim 17 wherein the location probability distribution is iteratively updated at predetermined time intervals.

19. A system according to claim 14 wherein the service area is subdivided into a plurality of sub-areas including at least one base station therein.

* * * * *